No. 850,582. PATENTED APR. 16, 1907.
M. C. HORTON.
CULINARY UTENSIL.
APPLICATION FILED JAN. 16, 1907.
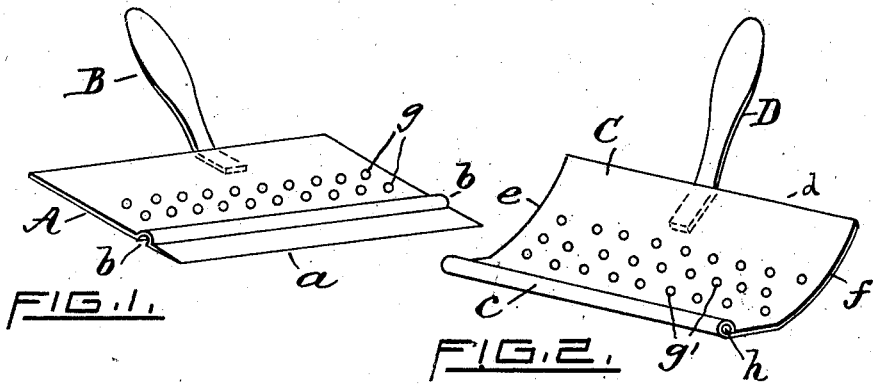
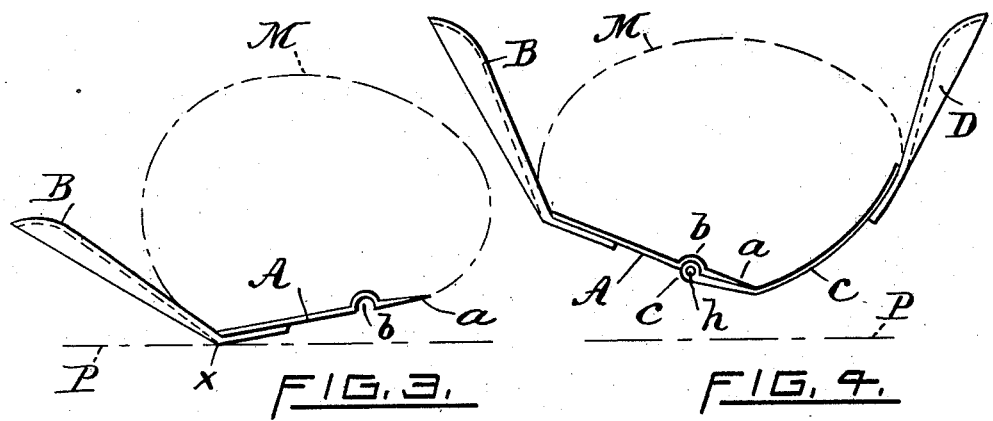
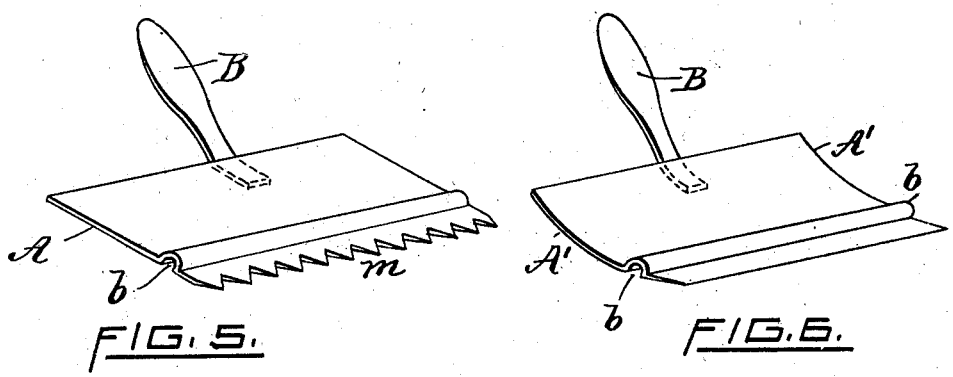
WITNESSES.
Charles T. Hannigan
Annie E. Perce.
INVENTOR.
Mary C. Horton
By Warren R. Perce
Atty.

UNITED STATES PATENT OFFICE.

MARY C. HORTON, OF WOONSOCKET, RHODE ISLAND.

CULINARY UTENSIL.

No. 850,582.     Specification of Letters Patent.     Patented April 16, 1907.

Application filed January 16, 1907. Serial No. 352,578.

*To all whom it may concern:*

Be it known that I, MARY C. HORTON, a citizen of the United States, residing at Woonsocket, in the county of Providence and State of Rhode Island, have invented certain new and useful Improvements in Culinary Utensils, of which the following is a specification, reference being had therein to the accompanying drawings.

Like reference-letters indicate like parts.

Figure 1 is a perspective view of the blade and handle constituting one member of my improved culinary utensil. Fig. 2 is a perspective view of the scoop and handle constituting the other member of said utensil. Fig. 3 is an end elevation of said blade and handle as seen in its position for separating the roasted meat from the bottom of the pan. Fig. 4 is an end elevation of the utensil as seen when its two members are in engagement with each other and coöperating to lift the roasted meat out of the pan. Figs. 5 and 6 illustrate modified forms of the blade or cutter.

My invention relates to kitchen utensils, and consists of a culinary implement for taking roasted fish, fowl, or other meat out of a roasting-pan; and it consists of the novel construction and combination of the several parts, as hereinafter described, and specifically set forth in the claim.

This implement is made of sheet metal and comprises two parts. One part (shown separately in Fig. 1) is a blade or cutter A, preferably rectangular in shape and provided on its rear edge with a handle B, which is riveted or soldered thereto or fastened in any suitable manner. This handle may be made of folded, rolled, or corrugated metal, so as to be rigid, firm, and strong. The blade A has a cutting edge $a$, and near to said cutting edge and parallel thereto the blade has a concavo-convex straight groove $b$, formed therein from end to end, the convex surface extending upwardly. It also has a plurality of holes $g$. The other part of the implement consists of a scoop C, having two parallel edges $c$ $d$ at the back and front, respectively, and is transversely curved from end to end, as illustrated by the lines $e f$. It is provided with a handle D, secured in position at the center of the rear edge $d$ and made like the handle B of the blade A as to shape, material, and mode of fastening, or in any other preferred manner. The scoop C has a plurality of holes $g$ at intervals to adapt it as a strainer. The forward edge $c$ is bent up or over to form a roll, and a wire $h$ may be inserted in said roll to stiffen it. The roll $c$ should be of such diameter as to enable it to fit in the groove $b$ of the blade A, as shown in Fig. 4.

The use of this implement is illustrated in Figs. 3 and 4. In Fig. 3, P represents in a dotted line the bottom of the roasting-pan. M indicates a piece of meat or a fish or fowl which has been roasted in the pan P in an oven. When the pan containing the roast has been removed from the oven and it is desired to remove the meat from the pan and to transfer it to a platter for the table, it is first necessary to separate the bottom of the roasted piece from the bottom of the pan in which it has been cooked. The piece M has been more or less stuck to the bottom of the pan P during the cooking operation and the cutting-blade A is first used. The cutting edge $a$, which is sufficiently sharp for this purpose, is inserted between the piece of meat M and the bottom of the pan P and is pushed forward by the handle B, and thus separates the meat from the pan wherever it adheres. Then by pressing down upon the handle B the implement becomes a lever whose fulcrum is at $x$, Fig. 3, and the piece M is slightly elevated from the pan. The open side of the groove $b$ is thus accessible, whereupon the scoop C is inserted by means of its handle D beneath the piece M and beneath the forward (cutting) edge of the blade A until its wired round straight edge $c$ enters and engages with the groove $b$ of the blade A from end to end. Then by bringing the handles B D into the relative positions shown in Fig. 4 and grasping them firmly and raising them both at the same time the roasted piece M is wholly lifted out of the roasting-pan and transferred to the platter. The removal and transfer are thus accomplished without the use of one or more forks, and the roasted meat, which is usually tender by reason of the cooking, is not torn or mutilated. This is especially important in the case of a roasted fish or fowl. A roasted fish is flaky when cooked and easily broken when forks or knives are used in removing it from the pan to the platter. My improved utensil not only enables this removal and transfer, but also allows a certain amount of drip. The meat is more or less covered with melted fat. The excess or undesired portion of this melted pan-grease is drained off through the holes $g$ $g'$ in the blade A and scoop C and drips off into the pan when the roasted meat is raised, as shown in Fig. 4.

The two parts of the implement are held in proper relation to each other and prevented from slipping apart by means of the engagement of the bead or round edge $c$ of the scoop C with the groove $b$ of the blade A; but it is obvious that there are other means of engagement than that shown in the drawings.

In Figs. 5 and 6 modified forms of the blade are shown; but they embody the same mechanical principle as that shown in Fig. 1. In Fig. 5 the cutting edge is provided with saw-teeth $m$. In Fig. 6 the blade instead of being flat is curved, as indicated at A'.

I claim as a novel and useful invention and desire to secure by Letters Patent—

The improved culinary implement herein described, consisting of two parts, one part having a handle and a flat blade mounted thereon and provided with a cutting edge and a half-round, longitudinally-extending groove parallel and contiguous to said cutting edge, and the other part having a handle and a transversely-curved scoop mounted thereon, which has a beaded, wired edge, which edge is insertible in and engageable with said groove In testimony whereof I affix my signature in presence of two witnesses.

MARY C. HORTON.

Witnesses:
H. A. COOK,
MARTHA L. COOK.